United States Patent
Chen et al.

(10) Patent No.: US 9,148,751 B2
(45) Date of Patent: Sep. 29, 2015

(54) WIRELESS CONTROL SYSTEM AND WIRELESS NETWORK EXPANSION METHOD APPLIED THERETO

(71) Applicant: Lextar Electronics Corporation, Hsinchu (TW)

(72) Inventors: Yuan-Ching Chen, Kaohsiung (TW); Chun-Kuang Chen, Taipei (TW)

(73) Assignee: LEXTAR ELECTRONICS CORPORATION, Hsinchu (TW)

( * ) Notice: Subject to any disclaimer, the term of this patent is extended or adjusted under 35 U.S.C. 154(b) by 54 days.

(21) Appl. No.: 14/172,952

(22) Filed: Feb. 5, 2014

(65) Prior Publication Data
US 2015/0011164 A1    Jan. 8, 2015

(30) Foreign Application Priority Data
Jul. 4, 2013  (TW) .............................. 102124016 A

(51) Int. Cl.
*H04W 4/00* (2009.01)
*H04L 12/28* (2006.01)
(Continued)

(52) U.S. Cl.
CPC .............. *H04W 4/008* (2013.01); *H04L 12/28* (2013.01); *H04W 48/16* (2013.01); *H04W 80/04* (2013.01); *H04W 84/20* (2013.01); *H05B 33/08* (2013.01); *H05B 37/02* (2013.01)

(58) Field of Classification Search
CPC ...... H04N 7/17318; H03J 1/20; H04W 84/06; H04W 88/06; H04W 76/02; H04M 2250/02
USPC .................... 455/3.04, 428, 435.2, 140, 41.2; 370/254, 255
See application file for complete search history.

(56) References Cited

U.S. PATENT DOCUMENTS 6,528,954 B1    3/2003  Lys et al.
6,795,421 B1 *  9/2004  Heinonen et al. ............. 370/338
(Continued)

FOREIGN PATENT DOCUMENTS

EP    2306777 A2    4/2011
TW    595261        6/2004
(Continued)

OTHER PUBLICATIONS

EP Search Report dated Nov. 28, 2014.
(Continued)

*Primary Examiner* — Minh D Dao
(74) *Attorney, Agent, or Firm* — McClure, Qualey & Rodack, LLP

(57) ABSTRACT

A wireless control system and a wireless network expansion method applied thereto are provided. The wireless control system comprises a mobile platform and a plurality of wireless devices capable of switching between a first role and a second role. The wireless network expansion method comprises following steps. A mobile platform is turned on. The mobile platforms scans the wireless devices and links to any wireless device serving the first role and then sends a control command to corresponding wireless device, which accordingly broadcasts the control command. The control command is received by at least one wireless device serving the second role. The wireless devices cyclically switch between the first role and the second role to continuously broadcast the control command to other wireless devices serving the second role, so that all of the wireless devices can finally receive the control command from the mobile platform.

16 Claims, 4 Drawing Sheets

(51) Int. Cl.
*H04W 84/20* (2009.01)
*H05B 33/08* (2006.01)
*H05B 37/02* (2006.01)
*H04W 48/16* (2009.01)
*H04W 80/04* (2009.01)

(56) References Cited

U.S. PATENT DOCUMENTS

| | | | |
|---|---|---|---|
| 7,221,961 B1* | 5/2007 | Fukumoto et al. | 455/557 |
| 2005/0073522 A1* | 4/2005 | Aholainen et al. | 345/440 |
| 2007/0061020 A1* | 3/2007 | Bovee et al. | 700/19 |
| 2011/0162046 A1* | 6/2011 | Forster et al. | 726/4 |
| 2012/0165006 A1* | 6/2012 | Ge et al. | 455/423 |
| 2012/0165026 A1* | 6/2012 | Ge et al. | 455/445 |
| 2012/0274234 A1 | 11/2012 | Campbell et al. | |
| 2012/0302219 A1 | 11/2012 | Vang | |
| 2013/0223286 A1* | 8/2013 | Corinella et al. | 370/255 |

FOREIGN PATENT DOCUMENTS

| | | |
|---|---|---|
| TW | 200740296 A | 10/2007 |
| WO | 2004023849 A1 | 3/2004 |

OTHER PUBLICATIONS

Bellido-Outeirino, et al.: "Building Lighting Automation through the Integration of DALI with Wireless Sensor Networks";0098 3063/12/ $20.00 © 2012 IEEE; XP055152580, pub. Date, Feb. 1, 2012; pp. 47-52.

XP002732566; The Protocol Stack; pub. Date, Dec. 31, 2002 (Bluetooth 1.1—Connect Without Cables 2nd Edition); pp. 9, 10, and 345-350.

English Abstract translation of TW595261 (Published Jun. 21, 2004).

TW Office Action dated Jun. 23, 2015 in corresponding Taiwan application (No. 102124016).

* cited by examiner

WIRELESS CONTROL SYSTEM AND WIRELESS NETWORK EXPANSION METHOD APPLIED THERETO

This application claims the benefit of Taiwan application Serial No. 102124016, filed Jul. 4, 2013, the subject matter of which is incorporated herein by reference.

BACKGROUND OF THE INVENTION

1. Field of the Invention

The invention relates in general to a wireless control system and a wireless network expansion method applied thereto, and more particularly to a system and its corresponding method in which Bluetooth wireless transmission is performed and controlled devices configured for the system are capable of switching between two roles so that the number of controlled devices can be extended and increased.

2. Description of the Related Art

Along with the advance in the technology of wireless transmission, related mobile computation devices or wireless transmission controlling devices have become popular in people's everyday life. Due to the features of electromagnetic waves, the transmission and reception of signals between devices are no more subject to the inconvenience and limitation encountered in the connection of physical wires. There are a large variety of products, such as information, communication, and entertainment products, employing wireless transmission. Examples of the products employing wireless transmission comprise notebook computer, keyboard, mouse, fax machines, projectors, printers, scanners, digital cameras, mobile phones, personal digital assistant, tablet PC, network cameras, TVs, stereos, speakers, headphones, microphones and modems. The said products can further be integrated with the Internet to expand functions or form a wireless local area network (WLAN) to control related devices within a particular range.

In terms of current technologies, wireless transmission can adopt wireless protocols or other related ways. For example, microwave, radio frequency (RF), laser, Wi-Fi (conformed to the IEEE 802.11 standard), third generation (3G), long term evolution (LTE) technology, fourth generation (4G), worldwide interoperability for microwave access (WiMAX), infrared (IR), Bluetooth, ZigBee (conformed to the IEEE 802.15.4 standard) or radio frequency identification (RFID) can be used in related wireless devices according to actual needs.

Thus, different transmission specifications or protocols have respective transmission frequency bands, transmission rates, transmission distances or loadable data, and can be used according to the needs of application. For example, Bluetooth is a wireless signal transmission technology conformed to the IEEE 802.15.1 standard and can achieve wireless signal transmission within a short distance (dozens of meters) by using a frequency band of 2.45 GHz. Bluetooth technology, advantageously featured by low power consumption, small chip size and low cost, is for connecting related wireless devices within a particular range and can be used in the control of wireless signal transmission within a short distance. For example, Bluetooth can be used for connecting a notebook computer and a peripheral device (such as a printer, a keyboard or a mouse), connecting a notebook computer and a personal digital assistant, or connecting a mobile phone and an earphone to form a wireless personal area network (WPAN).

However, different transmission specifications or protocols have different features and are subjected to different transmission restrictions or disadvantages. Let the current technology of Bluetooth wireless transmission be taken for example. Although the transmission distance within the WLAN is increased, the number of devices connected within the WLAN is still restricted. To put it in greater details, a Bluetooth network can only have 8 Bluetooth devices at most. Of the 8 Bluetooth devices, one is central control end (or control host), and the other 7 devices are controlled ends (or user ends). That is, one central control end can only connect and control 7 controlled devices in a one-to-one manner. If there are more than 7 controlled devices configured for a Bluetooth network or system, the original system control needs to be adjusted to collaborate with a cabled design. Although the number of controlled devices can be expanded and increased, system control cannot be implemented by way of wireless transmission only.

SUMMARY OF THE INVENTION

The present invention is directed to a wireless control system and a wireless network expansion method applied thereto. The system performs wireless transmission to form a Bluetooth local area network according to a Bluetooth wireless protocol. As the controlled devices configured for the system are capable of switching between two roles, the system and its corresponding method can be expanded and the number of controlled devices configured for the system can be increased. Thus, the system can form a larger Bluetooth local area network. In other words, the present invention breaks through the number restriction of controlled devices configured for a Bluetooth system in conventional technology.

According to one embodiment of the present embodiment, a wireless control system is provided. The wireless control system comprises a plurality of wireless devices and a mobile platform. Each of the wireless devices switches between a peripheral and broadcaster role and a central and observer role at a predetermined time interval. The mobile platform scans the wireless devices to link to any wireless device serving the peripheral and broadcaster role and then send a control command to the corresponding wireless device which further broadcasts the control command. The control command is received by at least one wireless device serving the central and observer role. The wireless devices cyclically switch the roles to continuously broadcast the control command to other wireless devices serving the central and observer role, so that all of the wireless devices can finally receive the control command from the mobile platform.

According to another embodiment of the present invention, a wireless network expansion method applied in a wireless control system is provided. The wireless control system comprises a mobile platform and a plurality of wireless devices capable of switching between a first role and a second role. The wireless network expansion method comprises following steps. A mobile platform is turned on. The mobile platform scans the wireless devices and links to any wireless device serving the first role and then sends a control command to the corresponding wireless device, and then the corresponding wireless device accordingly broadcasts the control command. The control command is received by at least one wireless device serving the second role. The wireless devices cyclically switch between the first role and the second role to continuously broadcast the control command to other wireless devices serving the second role, so that all of the wireless devices can finally receive the control command from the mobile platform.

The above and other aspects of the invention will become better understood with regard to the following detailed

DETAILED DESCRIPTION OF THE INVENTION

Figure 1A:
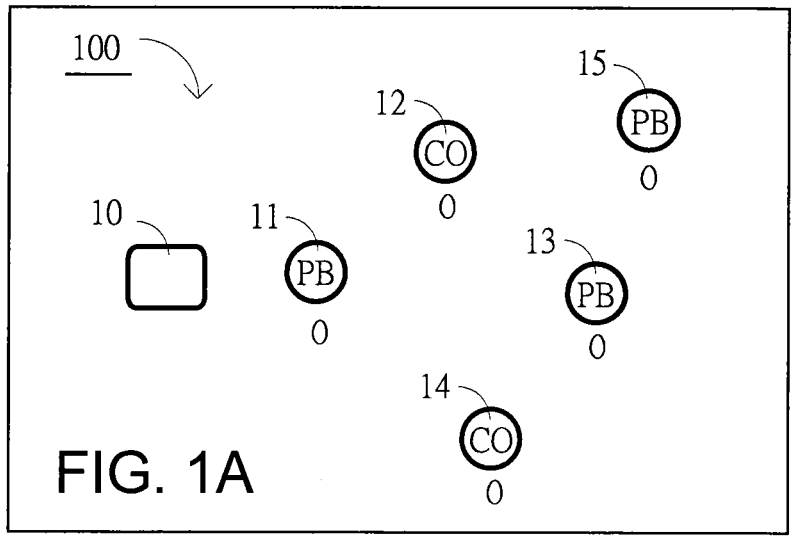
FIG. 1A to FIG. 1G are consecutive diagrams of controlling a wireless control system 100 by using a wireless network expansion method.

The wireless control system and the wireless network expansion method applied thereto provided in the present invention are exemplified by an exemplary embodiment below. Referring to FIG. 1A to FIG. 1G, consecutive diagrams of controlling a wireless control system 100 by using a wireless network expansion method are shown. The wireless control system 100 comprises a mobile platform 10 and a plurality of wireless devices 11-15. In the present embodiment, the mobile platform 10 controls operations of the wireless devices 11~15. Furthermore, wireless transmission can be performed between the mobile platform 10 and each of the wireless device 11~15 or between the wireless devices 11~15 via a wireless signal. To implement wireless transmission, a wireless protocol signal transmission module is set on the mobile platform 10 and each of the wireless devices 11~15 such that transmission can be performed via a wireless protocol signal.

In the present embodiment, the wireless protocol signal transmission module is exemplified by a Bluetooth wireless protocol signal transmission module. The wireless control system 100 of the present invention can be regarded as a Bluetooth network or system, and both the mobile platform 10 and each of the wireless devices 11~15 can be regarded as a Bluetooth device.

In terms of current technology, Bluetooth device which transmits wireless protocol signal by way of Bluetooth transmission can serve four different roles, namely central role, observer role, peripheral role and broadcaster role, according to the needs in practical application. The device serving the central role is used for locating device serving the peripheral role, creating Bluetooth connection and performing wireless transmission. The device serving the peripheral role can be located by device serving the central role and connected thereto for transmitting data. Device serving the broadcaster role can broadcast broadcasting data. Device serving the observer role can observe the data correspondingly broadcasted.

In the present embodiment, the four roles are integrated into a first role and a second role. The first role refers to a peripheral and broadcaster role, and the second role refers to a central and observer role. Device serving the first role broadcasts a received control command to other wireless devices. Device serving the second role observes and receives a control command broadcasted by other wireless devices. Furthermore, each of the wireless devices 11~15 switches between the peripheral and broadcaster role (the first role) and the central and observer role (the second role) at a predetermined time interval so as to sequentially perform observing and broadcasting.

The wireless network expansion method disclosed in the present invention mainly comprises following steps. Firstly, a mobile platform 10 is turned on. Next, the wireless devices 11~15 are scanned by the mobile platform 10. The mobile platform 10 links to any wireless device serving the first role and then sends a control command to the corresponding wireless device, and then the corresponding wireless device accordingly broadcasts the control command. Then, the control command is received by at least one wireless device serving the second role. Lastly, each wireless device cyclically switches between the first role and the second role to continuously broadcast the control command to other wireless devices serving the second role, so that all of the wireless devices 11~15 can finally receive the control command from the mobile platform 10.

In order to complete the operation of the wireless control system 100, the wireless network expansion method of the present invention is loaded on all of the wireless devices 11~15 in the form of a firmware program, and another corresponding APP application program is loaded on the mobile platform 10. Once the APP application program is executed, the operation control of the wireless devices 11~15 can be performed on the mobile platform 10. In the present embodiment, the mobile platform 10 can be exemplified by a smart electronic device (such as a smart mobile phone or a tablet PC adopting an operating system having a wireless reception function such as Android OS, Windows OS or iOS) capable of loading an APP application program.

On the other hand, the wireless network expansion method of the present invention is directed to resolving the restriction encountered in current technology that a Bluetooth network can only have 8 Bluetooth devices at most (one device is central control end, and the other 7 devices are controlled ends). The wireless control system 100 illustrated in FIG. 1A to FIG. 1G only has 6 Bluetooth devices (1 mobile platform and 5 wireless devices). However, the wireless control system 100 applying the wireless network expansion method of the present invention can control more than 6 Bluetooth devices, and the number of controllable wireless devices (that is, controlled end) increases and is larger than 7, which is the maximum number allowed in conventional technology. Detailed procedures of the implementation of the wireless network expansion method are disclosed below.

The role that each of the wireless devices 11~15 currently serves is illustrated in FIG. 1A to FIG. 1G, wherein "PB" represents the first role, and "CO" represents the second role. The reception state of each of the wireless devices 11~15 corresponding to the control command is represented by "0" or "1" illustrated under respective wireless device; wherein "0" indicates that the control command has not yet been received, and "1" indicates that the control command has been received.

In the stage as illustrated in FIG. 1A, none of the wireless devices 11~15 receives the control command (that is, the reception state is "0"). In the present embodiment, each of the wireless devices 11~15 switches between the first role and the second role at a predetermined time interval, and respective switching time point is dependent on the operation of each device. To put it in greater details, respective predetermined time interval of each the wireless devices 11~15 can be designed to be the same or different, such that the role which each device serves at the initial stage forms a random distribution. Since time difference may exist between respective switching time points of the devices, the role which each device serves in subsequent process may form an irregular distribution. Under an exemplary condition of implementation, the devices may serve the first role and the second role at the same time in the initial stage instead of serving only one role.

Figure 1B:
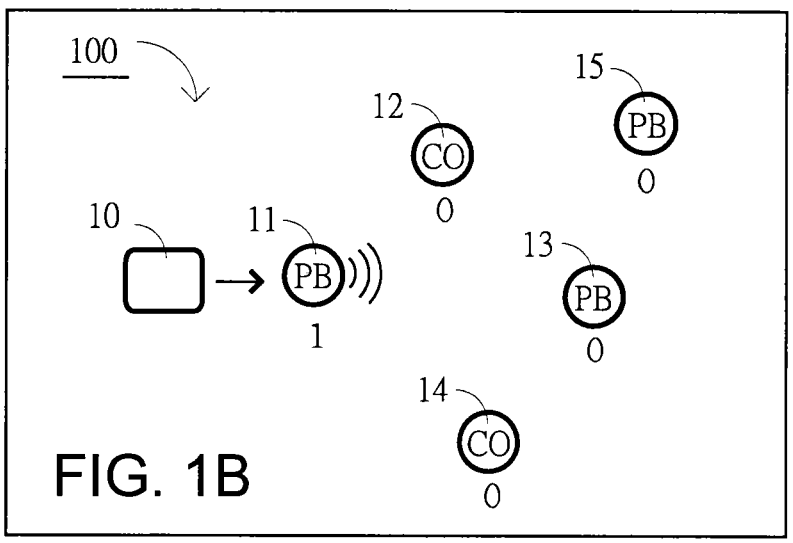
Figure 1C:
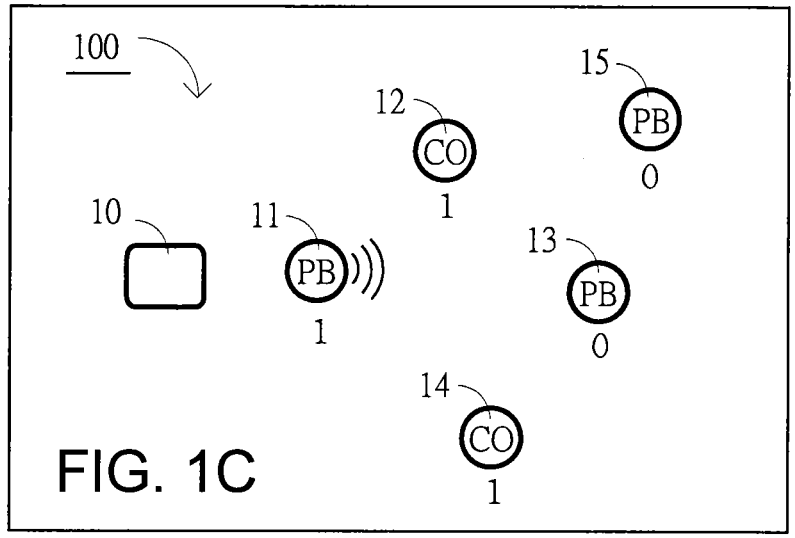

After having activated corresponding APP application program, the mobile platform 10 starts to scan each of the wireless devices 11~15. In the stage as illustrated in FIG. 1B, the mobile platform 10 links to the wireless device 11 serving the first role and then sends a control command to corresponding wireless device 11, such that the reception state of the wireless device 11 is "1". Then, the wireless device 11 broadcasts the received control command. In the present embodiment, the wireless device 11 can broadcast the received control command to other wireless devices, and any wireless devices serving the second role can receive the broadcasted control command. To put it in greater details, the wireless devices serving the first role will be only responsible for broadcasting the control command and will not specify which wireless device will be sent to, but the wireless devices serving the second role will perform scanning process to locate whether any control command is sent. As indicated in FIG. 1B and FIG. 1C, the wireless devices 12 and 14 receive the control command, such that the reception state of the wireless devices 12 and 14 is "1".

Figure 1D:
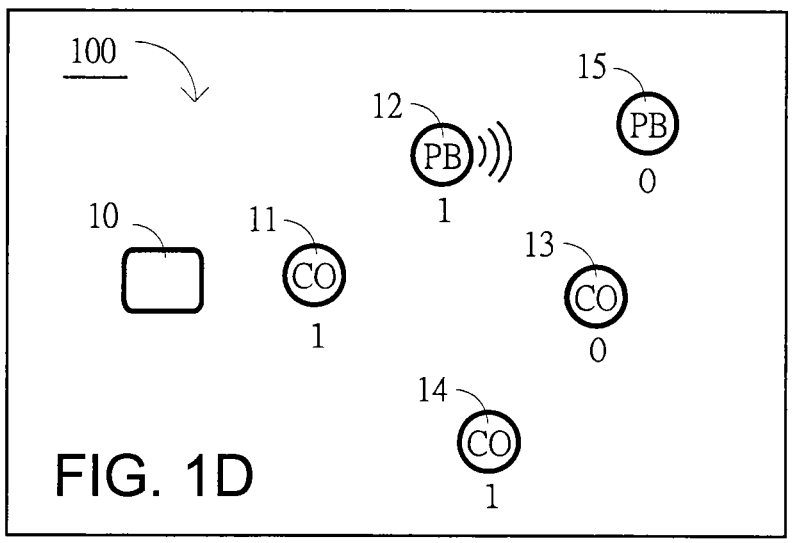
Figure 1E:
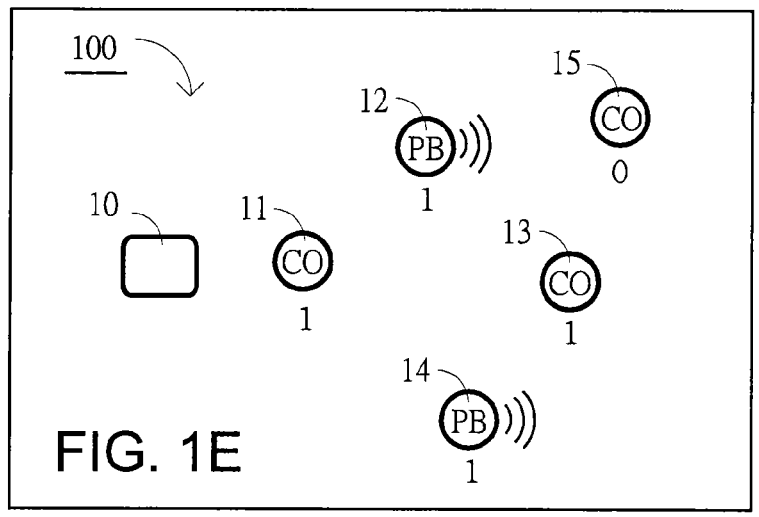

In the stage as illustrated in FIG. 1D, the wireless devices 11, 12, and 13 perform role switching in response to the maturity of corresponding predetermined time interval, wherein the wireless devices 11 and 13 switch to the second role from the first role and the wireless device 12 switches to the first role from the second role. Thus, the wireless device 12 can broadcast the control command to other wireless devices. As indicated in FIG. 1D and FIG. 1E, the wireless device 13 serving the second role receives the control command, and corresponding reception state is "1". As indicated in FIG. 1E, the wireless device 14 switches to the first role from the second role in response to the maturity of corresponding predetermined time interval.

Figure 1F:
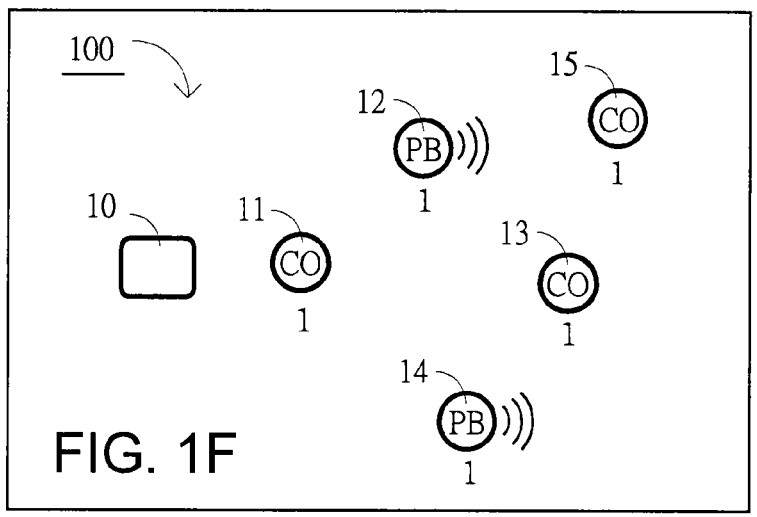

In the stage as illustrated in FIG. 1E, in addition to the wireless device 12, the wireless device 14 switching to the first role also starts to broadcast the control command. As indicated in FIG. 1E and FIG. 1F, the wireless device 15 serving the second role accordingly receives the control command, and corresponding reception state is "1". In the present embodiment, the control command received by the wireless device 15 is broadcasted by the wireless device 12 or the wireless device 14. In the stage as indicated in FIG. 1F, all of the wireless devices (5 wireless devices 11~15 illustrated) receive the control command.

Figure 1G:
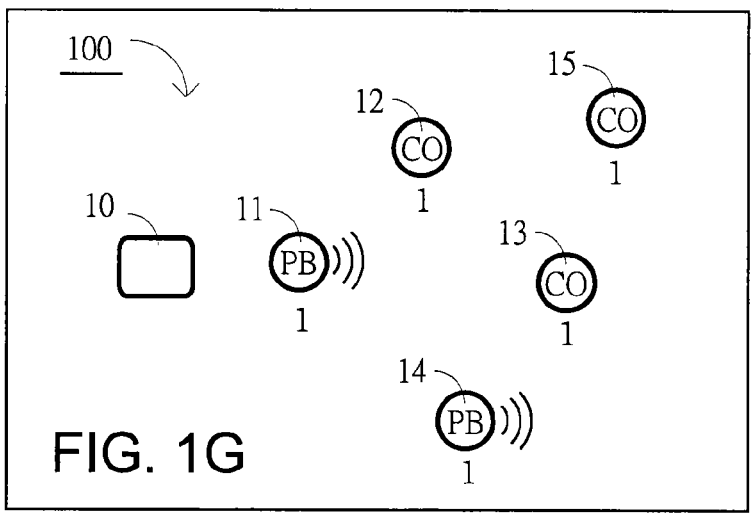

Lastly, in the stage as illustrated in FIG. 1G, the wireless devices 11 and 12 perform role switching in response to the maturity of corresponding predetermined time interval. Meanwhile, any wireless devices not receiving the control command can receive the control command broadcasted by related wireless devices serving the first role according to the above steps. Through the design that all of the wireless devices can switch between two roles, corresponding control command can be broadcasted and transferred again and again, and the wireless network can be expanded and extended to from an even larger Bluetooth local area network and break through the number restriction of controlled devices configured for within a Bluetooth system in conventional technology.

Based on the concept disclosed in above descriptions, the wireless network expansion method of the present invention is capable of enabling all wireless devices within the system to receive corresponding control command and directing the control content of the control command transmitted by the mobile platform 10 towards particular wireless devices despite that all of the wireless devices can receive the control command. To put it in greater details, the control command of the present embodiment further contains a target address, and each of the wireless devices 11~15 contains a device address. That is, the target address represents the target device of the control command. Furthermore, the target address may correspond to one to many device addresses, such that one to many (or all) wireless devices within the system can be specified and controlled.

As indicated in FIG. 1A and FIG. 1B, the mobile platform 10 only transmits the control command to the wireless device 11 (or any other wireless device serving the first role), which accordingly broadcasts the control command when the wireless device 11 serves the first role. In the present embodiment, the transmission of the control command must starts with the broadcasting by any wireless device serving the first role. That is, the control command is broadcasted to specified devices through different transmission paths according to the random distribution of the role served by each wireless device.

According to the design of the present invention, when a related wireless device serving the second role (or the first wireless device receiving the control command such as the wireless device 11 of FIG. 1B) receives a control command, the related wireless device will first of all read and decipher the target address of the control command. During the deciphering process, if it is found that the target address contains a corresponding device address, the control content of the control command needs to be executed. To the contrary, if the target address does not contain a corresponding device address, the control content of the control command does not need to be executed. Under the circumstance that each wireless device has received the control command, the target device of the control command can completely execute corresponding control content. On the other hand, the configuration of the corresponding device address of each wireless device can be completed at the same time when the system is established, and can be loaded in the APP application program of the mobile platform 10.

It can be known from the prior art that the said wireless devices has a large variety in practical application, and may fall into categories such as information, communication and entertainment. The wireless control system of the present invention and the network expansion method applied thereto can be effectively used in the above categories of wireless devices. For example, each wireless device disposed in the present embodiment is a wireless lighting device using LED as a lighting element. The control command may comprise a light parameter. The light parameter is for controlling the LED, and is selected from a group composed of color temperature, brightness, light angle and lighting time. That is, such category of wireless lighting devices can wirelessly control lighting function, such as on/off switching and the adjustment of brightness or color temperature.

Due to the time difference existing in role switching of each device and the failure of confirming which device receives the control command first, time priorities are formed when related wireless devices (particularly when many wireless devices are specified in the target address) execute the control content of the control command, and the control content of the control command may not be completed at the same time. For example, related wireless lighting devices execute the lighting functions in sequence, such that the wireless lighting devices are turned on one by one and cannot illuminate at the same time.

The wireless network expansion method of the present invention is featured in that all wireless devices in the system can receive corresponding control command, and each device is capable of switching between two different roles at a corresponding predetermined time interval. Although such design assures that all devices can receive the command, all devices will keep broadcasting within the system even after the command is already received. In above descriptions corresponding to FIG. 1A to FIG. 1G, the state of reception is that the wireless device serving the second role does not receive the control command, and the reception state changes to "1" from "0" after the said device receives the control command. Suppose the above design is implemented. After the said wireless device receives the control command and switches to the second role again, the said wireless devices will keep receiving the command and end up with double reception.

The present embodiment further provides a judgment mechanism to terminate broadcasting immediately once all devices have received the command, hence avoiding the occurrence of double reception. To put it in greater details, the control command of the present embodiment further contains a broadcasting count being an integer larger than 0. Each time after a wireless device serving the first role broadcasts the control command, the broadcasting count of the broadcasted control command will correspondingly be deducted by 1. That is, the broadcasting count will become smaller and smaller as the control command is broadcasted and transferred between the devices again and again. Thus, when the broadcasting count is deducted to 0, the broadcasting of the control command will be terminated. That is, the control command is deleted from the transmission network of the system, hence avoiding devices continuously performing broadcasting within the system.

On the other hand, the value of the broadcasting count also represents whether the control command is newer or an older data at a particular time point. A smaller broadcasting count suggests that the control command has been broadcasted for a larger number of times and can thus be regarded as older data. Similarly, a larger broadcasting count suggests that the control command has been broadcasted for a smaller number of times and can thus be regarded as newer data. To assure that each device can receive the control command containing newer data, the present embodiment provides a comparison mechanism. The wireless device serving the second role compares the broadcasting count of the control command received thereby with another broadcasting count of the control command broadcasted by other wireless devices serving the first role to determine whether the received data is newer than the currently broadcasted data.

In the present embodiment, when the broadcasting count of the control command received by corresponding wireless device is larger than or the same as the broadcasting count of the currently broadcasted control command, this suggests that the received control command is newer than or the same as the currently broadcasted control command, and the wireless device does not receive the currently broadcasted control command. Similarly, when the broadcasting count of the control command received by corresponding wireless device is smaller than the broadcasting count of the currently broadcasted control command, this suggests that the received control command is older than the currently broadcasted control command, and the corresponding wireless device accordingly receives the currently broadcasted control command and deletes the previously received control command. The above design assures that each device receives only the control command containing newer data and avoids receiving the control command containing older or the same data.

The broadcasting count also serves as a reference of reception for wireless devices not receiving the control command. To put it in greater details, at a particular time point, there could be more than one wireless device serving the first role. That is, there could be one to many wireless devices broadcasting control command at the same time. Under such circumstance, a comparison of broadcasting count is made between wireless devices serving the second role and wireless devices not receiving the control command, and the control command containing newer data is selected and received according to the result of comparison.

As indicated in the stages of FIG. 1E to FIG. 1F, the wireless devices 12 and 14 serve the first role at the same time, and at the same time broadcast a control command which is received by the wireless device 15. After the wireless device 11 of FIG. 1A broadcasts a control command to the wireless devices 12 and 14 respectively, both the wireless devices 12 and 14 experience one time of broadcasting and have the same broadcasting count. Thus, the wireless device 15 can receive the control command from either of the wireless devices 12 and 14.

Figure 2:
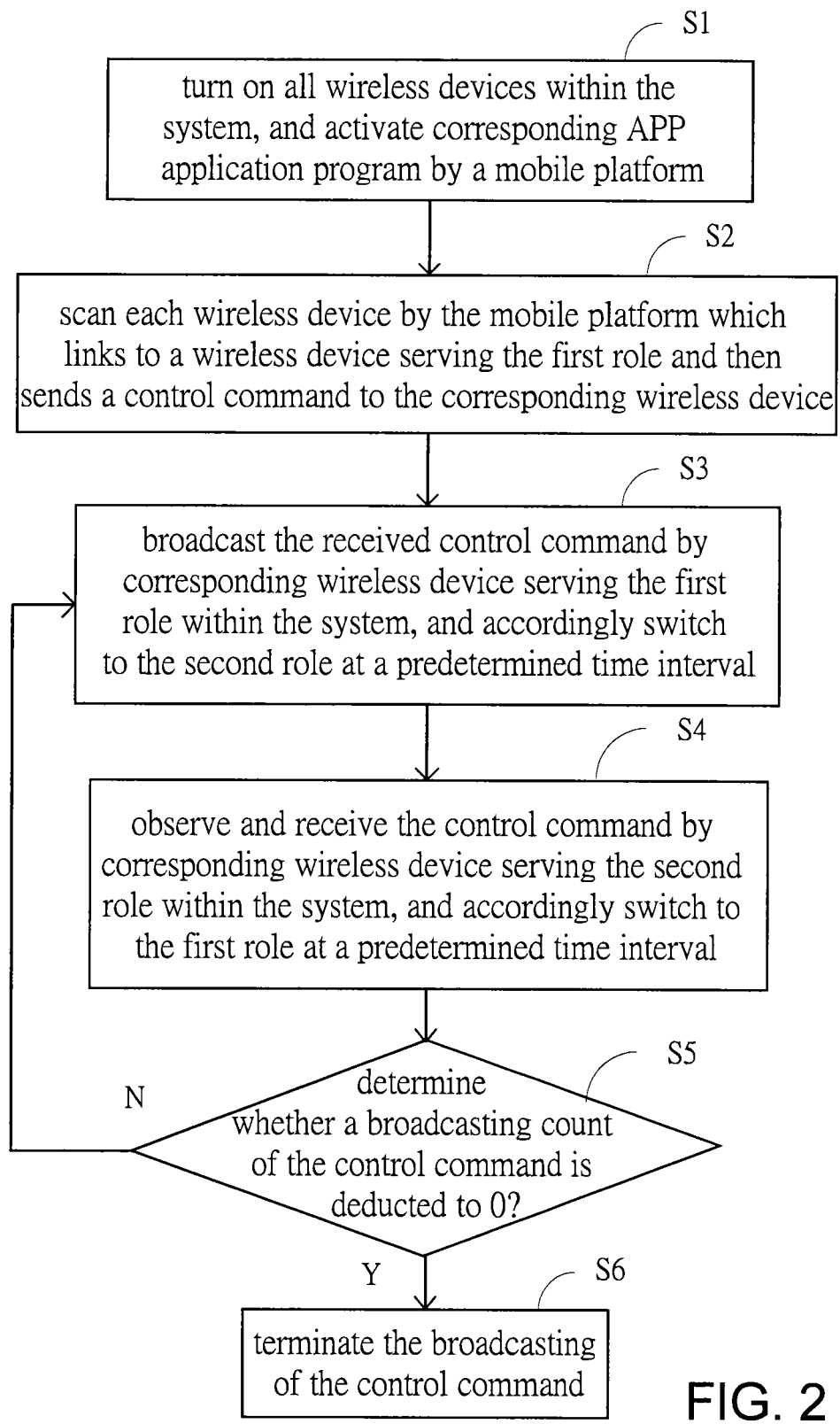
FIG. 2 an implementation flowchart according to an exemplary embodiment of the present invention.

The flowchart of FIG. 2 illustrates main implementation steps of the exemplary embodiment. Firstly, all wireless devices within the system are turned on, and corresponding APP application program is activated by a mobile platform (step S1). Next, each wireless device is scanned by the mobile platform which links to a wireless device serving the first role and then sends a control command to the corresponding wireless device (step S2). Meanwhile, corresponding wireless device serving the first role within the system broadcasts the control command received thereby, and accordingly switches to the second role at a predetermined time interval (step S3). Then, corresponding wireless device serving the second role within the system observes and receives the control command, and accordingly switches to the first role at a predetermined time interval (step S4). Then, judgment is made according to a broadcasting count of the control command (step S5). Then, broadcasting of the control command is terminated when the broadcasting count is deducted to 0 (step S6). However, when the broadcasting count is not deducted to 0, the above steps of broadcasting and reception are repeated.

According to the design of the present invention, the wireless devices (that is, controlled end) configured for the network or the system are capable of switching between two roles, that is, each wireless device serving a corresponding role can respectively perform observing and broadcasting. Thus, the control command correspondingly transmitted from the mobile platform (that is, central control end) can be broadcasted and transferred again and again, and the Bluetooth wireless network can thus be expanded and extended. Furthermore, the method of the present invention not only allows all wireless devices within the system to receive corresponding control command but also directs the control command towards all or specified wireless devices.

Based on the above disclosure, the wireless control system of the present invention and the wireless network expansion method applied thereto indeed resolve the restriction encountered in current technology that a Bluetooth network can only have 8 Bluetooth devices at most (one device is central control end, and the other 7 devices are controlled ends). The present invention can extend and increase the number of controlled devices through wireless transmission without making any adjustments to collaborate with a cabled design. Thus, the present invention successfully resolves the problems encountered in the prior art and benefits the improvement and development in the technology of the industry.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wireless control system, comprising:
a plurality of wireless devices each switching between a peripheral and broadcaster role and a central and observer role at a predetermined time interval; and
a mobile platform for scanning the plurality of wireless devices to link to any wireless device serving the peripheral and broadcaster role and then send a control command to the corresponding wireless device, which accordingly broadcasts the control command to be received by at least one wireless device serving the central and observer role;
wherein, the plurality of wireless devices cyclically switch between the peripheral and broadcaster role and the central and observer role to continuously broadcast the control command to other wireless devices serving the central and observer role, so that all of the plurality of wireless devices can finally receive the control command from the mobile platform.

2. The wireless control system according to claim 1, wherein the mobile platform and each of the plurality of wireless devices respective have a wireless protocol signal transmission module, and perform transmission by using a wireless protocol signal.

3. The wireless control system according to claim 2, wherein the wireless protocol signal transmission module is a Bluetooth signal transmission module.

4. The wireless control system according to claim 1, wherein the plurality of wireless devices decipher a target address of the control command, and execute the content of the control command when the target address contains a corresponding device address of the wireless devices.

5. The wireless control system according to claim 1, wherein the wireless device is a wireless lighting device.

6. The wireless control system according to claim 5, wherein the wireless lighting device comprises light emitting diode (LED), and the control command comprises a light parameter controlling the LED.

7. The wireless control system according to claim 6, wherein the light parameter is selected from a group composed of color temperature, brightness, light angle and lighting time.

8. The wireless control system according to claim 1, wherein the mobile platform is a smart electronic device.

9. The wireless control system according to claim 8, wherein the mobile platform downloads an APP application program for controlling the plurality of wireless devices.

10. The wireless control system according to claim 9, wherein the smart electronic device is selected from a smart mobile phone or a tablet PC adopting Android OS, Windows OS or iOS.

11. A wireless network expansion method applied in a wireless control system, wherein the system comprises a mobile platform and a plurality of wireless devices capable of switching between a first role and a second role, and the method comprises following steps:
turning on the mobile platform;
scanning the plurality of wireless devices by the mobile platform which links to any wireless device serving the first role and then sends a control command to the corresponding wireless device and then the corresponding wireless device accordingly broadcasting the control command;
receiving the control command by at least one wireless device serving the second role; and
enabling the plurality of wireless devices to cyclically switch between the first role and the second role to continuously broadcast the control command to other wireless devices serving the second role, so that all of the plurality of wireless devices can finally receive the control command from the mobile platform.

12. The wireless network expansion method according to claim 11, wherein each of the plurality of wireless devices switches between the first role and the second role at a predetermined time interval, and respective predetermined time intervals of the plurality of wireless devices are the same or different.

13. The wireless network expansion method according to claim 11, wherein the first role is a peripheral and broadcaster role for broadcasting the received control command to other wireless devices, and the second role is a central and observer role for observing and receiving the control command broadcasted by other wireless devices.

14. The wireless network expansion method according to claim 11, wherein the control command contains a target address, each of the plurality of wireless devices contains a device address, and the method comprises following steps:
reading the target address of the received control command by the wireless device serving the second role; and
executing the content of the control command by the wireless devices when the target address contains a corresponding device address of the wireless devices.

15. The wireless network expansion method according to claim 11, wherein the method comprises following steps:
setting a broadcasting count by the control command, wherein the broadcasting count is an integer larger than 0;
deducting the broadcasting count by 1 after the corresponding wireless device serving the first role broadcasted the control command for one time; and
terminating broadcasting when the broadcasting count is deducted to 0.

16. The wireless network expansion method according to claim 15, wherein the method comprises following steps:
comparing the broadcasting count of the control command received by the corresponding wireless device serving the second role with another broadcasting count of the control command broadcasted by other wireless device serving the first role;
not receiving the control command broadcasted by other wireless device when the broadcasting count of the control command received by the corresponding wireless device is larger than or the same as that of the control command broadcasted by other wireless device serving the first role; and
receiving the control command broadcasted by other wireless device and deleting previously received control command when the broadcasting count of the control command received by the corresponding wireless device is smaller than that of the control command broadcasted by other wireless device serving the first role.

* * * * *